(12) United States Patent
Dixon

(10) Patent No.: US 6,832,416 B2
(45) Date of Patent: Dec. 21, 2004

(54) CAM ACTUATED SIDEWALL RETAINER CLAMP

(75) Inventor: Robert D. Dixon, Everett, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/429,339

(22) Filed: May 2, 2003

(65) Prior Publication Data

US 2004/0216286 A1 Nov. 4, 2004

(51) Int. Cl.[7] .............................................. A44B 21/00
(52) U.S. Cl. ........................................ 24/536; 24/498
(58) Field of Search .................... 24/536, 538, 542, 24/544, 498, 67.3, 67.5, 67 R, 170, 171, 328, 329, 330, 333, 337, 348, 349, 26 SEC; 294/116

(56) References Cited

U.S. PATENT DOCUMENTS

| | | | |
|---|---|---|---|
| 499,933 A | | 6/1893 | Phillips |
| 610,967 A | * | 9/1898 | Hill .............................. 24/337 |
| 849,092 A | * | 4/1907 | Webb .......................... 24/532 |
| 1,634,532 A | | 7/1927 | Bowe |
| 2,228,360 A | | 1/1941 | Nordeck |
| 2,463,451 A | * | 3/1949 | Yates ......................... 24/67.5 |
| 2,845,983 A | * | 8/1958 | Hanson ....................... 24/542 |
| 3,101,185 A | * | 8/1963 | Gustafson ................... 24/538 |
| 3,950,829 A | | 4/1976 | Cohen |
| 4,813,107 A | | 3/1989 | Cetrone |

OTHER PUBLICATIONS

Publication "Cam Bar Clamps, Hard Maple Clamping Jaws and Cam, Oil Finish Cork Face on Clamping Jaws Spring Steel Bar, Zing Plated Clear Chromate, Carr Lane Manufacturing Co.".
Publication "right–tool.com, D3001 Cam Action 6" Wood F–Clamp.".
Publication "The Best Things "Where the Connoisseur Shops", Dubuque Clamp Works Cam Action Bar Clamps.".

* cited by examiner

Primary Examiner—Robert J. Sandy
(74) Attorney, Agent, or Firm—Harness Dickey & Pierce P.L.C.

(57) ABSTRACT

A clamp formed from a single block of resilient material, and preferably from nylon. A living hinge is formed that couples upper and lower jaws of the clamp. First and second arms extend rearwardly from the upper and lower jaws, respectively. A pivotally mounted camming member secured to one of the arms can be manually moved by a user from a first position, wherein it holds the jaws in tight, clamping engagement with an assembly position therebetween, to a second position in which the jaws can be opened. The clamp requires only a minimal degree of user effort during use, therefore making it particularly ideally suited for applications where a large plurality of the clamps must be used and repeatedly applied, then taken off from, one or more workpieces.

7 Claims, 3 Drawing Sheets

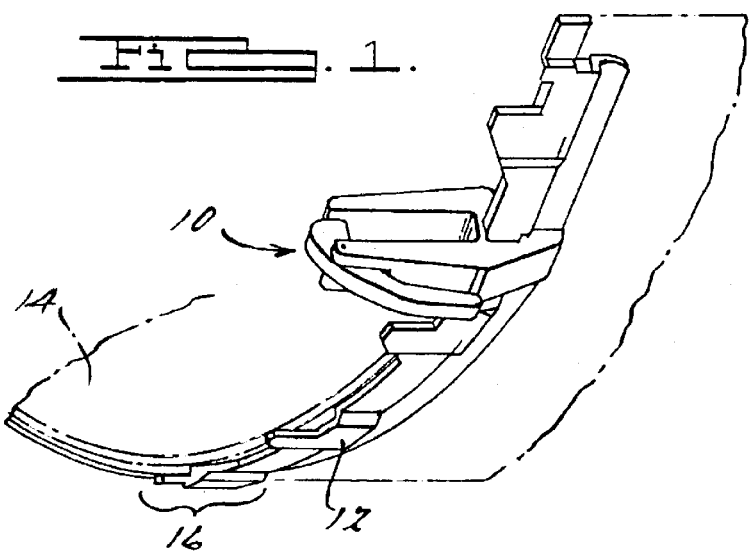
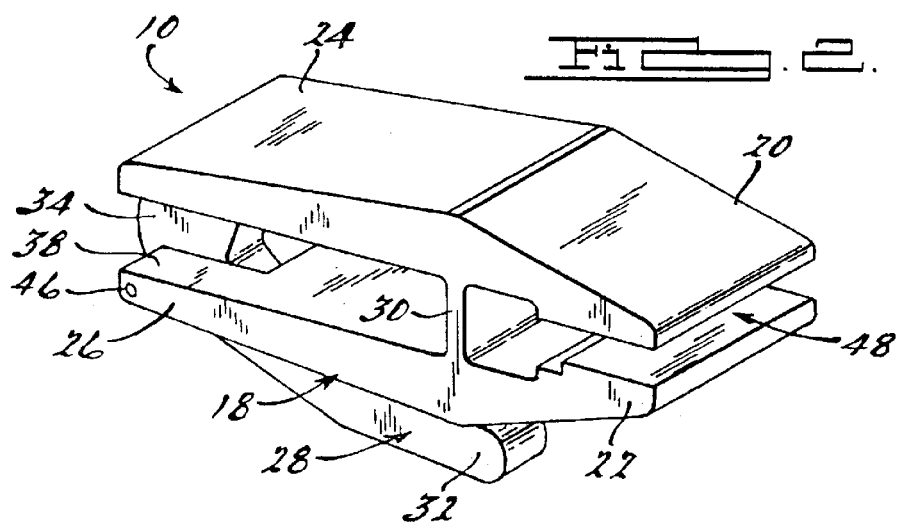
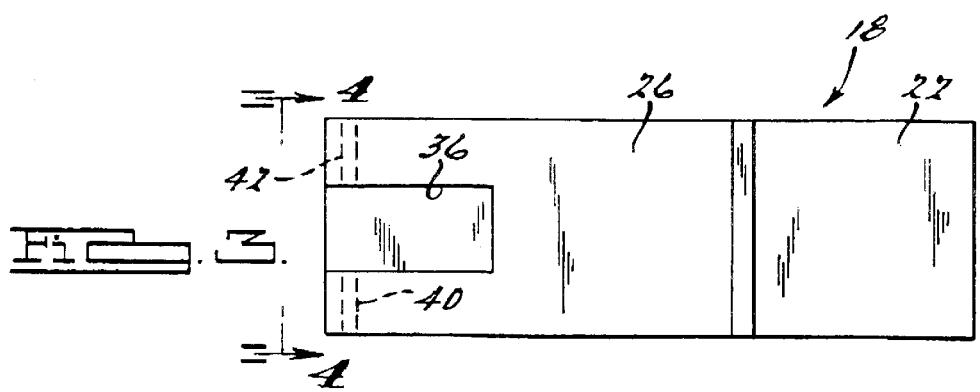

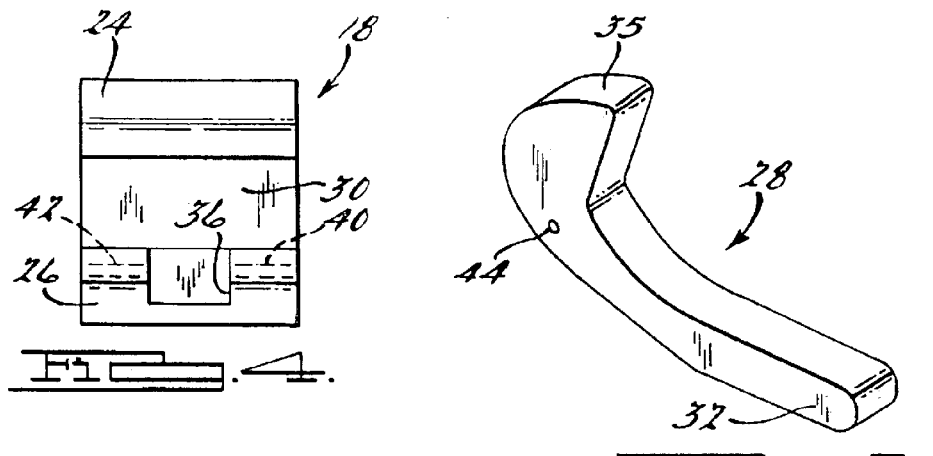
FIG. 4.
FIG. 5.
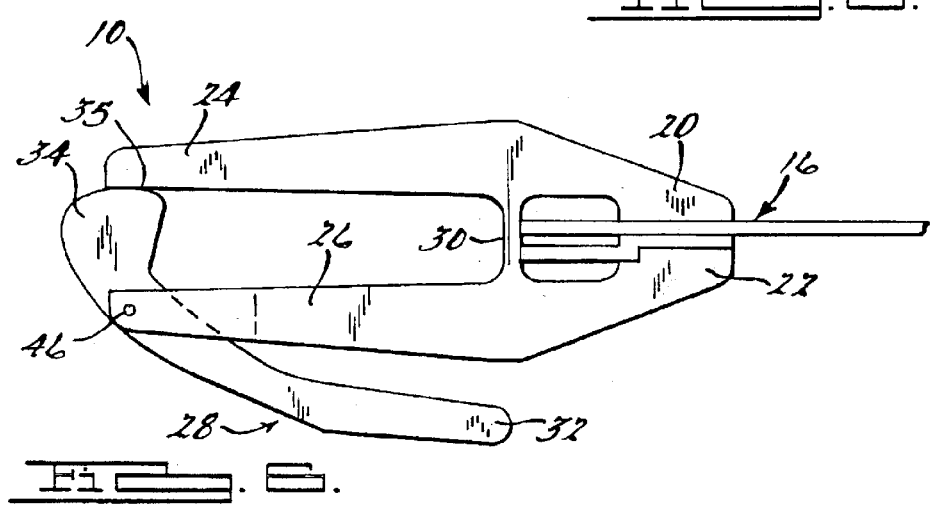
FIG. 6.
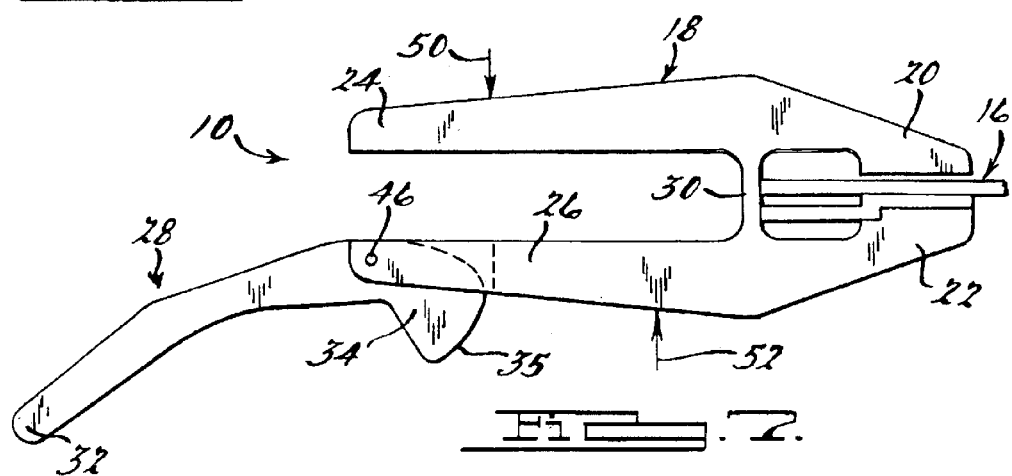
FIG. 7.

CAM ACTUATED SIDEWALL RETAINER CLAMP

FIELD OF THE INVENTION

This invention relates to clamps, and more particularly to a clamp having a living hinge, which can be quickly and easily placed in a clamped position with a minimal degree of physical effort by a user.

BACKGROUND OF THE INVENTION

Clamps are used in a wide variety of applications. Typically, the clamp is comprised of a pair of jaws which are held pivotally to one another by a pivot pin or other like arrangement, and which includes a biasing spring which biases the jaws into a clamped position relative to each other. In some applications where a number of clamps need to be placed on a workpiece and then taken off, and this process repeated a number of times, the requirement of that the user has to use significant physical effort to overcome the spring force of the clamp in order to place the clamp on to the workpiece, and then again to take the clamp off of the workpiece, can lead to significant operative fatigue. This repeated process can also eventually slow down work tasks as workers become more and more fatigued from repeatedly applying and then removing a number of clamps. One such application involving the application of a large number of clamps is in the construction of commercial aircraft, and more particularly in the construction of interior panels used in commercial aircraft. Certain stages of construction of the interior panels involve adhering plastic trim pieces at the edges of interior panels. This assembly step requires the placement of a relatively large number of clamps onto the edges of the panels. This process has to be repeated a large plurality of times during the course of manufacture and assembly of the interior panels used in a commercial aircraft. Accordingly, a clamp which requires less physical effort by workers to use would be highly desirable in relieving worker fatigue and reducing the time needed to perform various assembly tasks.

SUMMARY OF THE INVENTION

The present invention is directed to a clamp which can be more easily manually manipulated by a worker, and thus causes a lesser degree of user fatigue when using the clamp. The clamp of the present invention comprises a main body having a pair of jaws and a pair of arms portions. Each arm portion is operably associated with one of the jaws. A living hinge is formed at a portion of the main body to allow the jaws to be flexed toward or away from one another.

At least one of the arms includes a camming member coupled thereto. In one preferred form the camming member is pivotally coupled to the arm. The camming member includes a graspable portion that may be easily grasped with a single hand of the user. The camming member can be moved by the user between a first position, wherein it prevents movement of the jaws relative to one another out of the clamped position, to a second position wherein the jaws can be urged away from one another. Moving the camming member from the first position to the second position requires only a very small degree of physical effort of the user, and typically considerably less effort than is required with many clamps employing coil-type biasing springs.

When the camming member is placed in a first position, portions of it interfere with the arms to prevent the jaws from being opened relative to one another. Thus, in this position the jaws remain clamped to an external assembly placed therebetween. However, when the camming member is manually moved by a user into a second position, the arms are allowed to move relative to one another, which in turn allows the jaws to move away from the external assembly placed therebetween. Thus, the external assembly can be removed. The camming action provided by the camming member allows the jaws to be placed in a clamped position with only a very minimal degree of user force being needed to be exerted on the camming member. Thus, the present invention can be used repeatedly in applications where the use of a conventional clamp having a coil biasing spring to bias the jaws of the clamp toward one another could result in significant operator fatigue.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a clamp in accordance with a preferred embodiment of the present invention being used to secure a plastic retainer component to an edge of an interior wall panel of a commercial aircraft;

FIG. 2 is a front perspective view of the clamp of the present invention;

FIG. 3 is a bottom plan view of just the main body of the clamp;

FIG. 4 is a rear end view of the main body taken in accordance with directional line 4—4 in FIG. 3;

FIG. 5 is a perspective view of the camming member;

FIG. 6 is a side view of the clamp in its clamped position securing an external assembly between the jaws of the clamp;

FIG. 7 is a side view of the clamp of FIG. 6 but with the clamp in the open position wherein the external assembly can be removed from between the jaws;

DETAILED DESCRIPTION OF THE PREFERRED EMBODIMENTS

Figure 8:
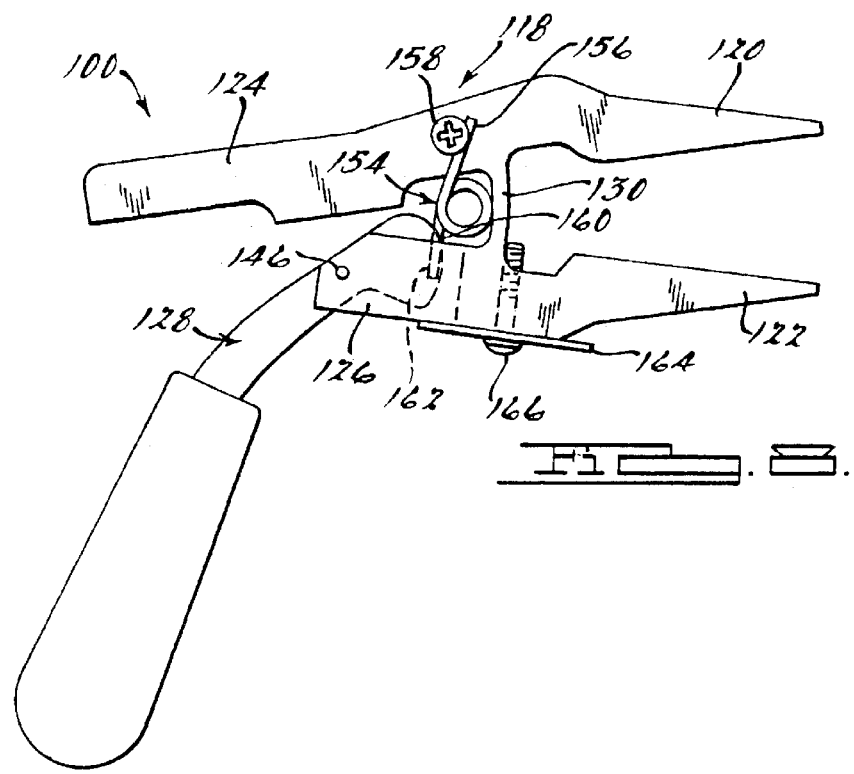
FIG. 8 is a side view of a clamp in accordance with an alternative preferred embodiment of the present invention, in the unclamped position.

The following description of the preferred embodiment(s) is merely exemplary in nature and is in no way intended to limit the invention, its application, or uses.

Referring to FIG. 1, there is shown a clamp 10 in accordance with a preferred embodiment of the present invention. The clamp 10 is shown secured to a plastic retainer member 12 positioned against an interior panel 14 of a commercial aircraft. It will be appreciated immediately, however, that the clamp is not limited to applications involving the manufacture of commercial aircraft, but will find utility in a wide variety of other applications where it is necessary to be able to quickly and easily clamp two or more components together with a short, convenient movement that does not require significant operator effort, and which does not result in significant operator fatigue when the clamp must be used repeatedly over a given period of time. For purposes of discussion, retainer member 12 and panel 14 will be cooperatively referred to as external assembly 16.

With specific reference to FIGS. 1 and 2, the clamp 10 comprises a main body 18 comprised of a first jaw 20, a second jaw 22, a first arm 24, a second arm 26 and a camming member 28. First arm 24 is formed generally coextensively with first jaw 20, while second arm 26 is formed generally coextensively with second jaw 22. Jaws 20 and 22 are separated from one another by a living hinge 30. In one preferred form the entire main body 18 is formed from a single piece of suitably resilient material, and more preferably from TY-6 nylon. The thickness of the living hinge 30 may vary considerably, but in one preferred form is preferably between about 0.06 inch–0.08 inch (1.524 mm–2.032 mm). Other suitable material for the main body 18 may comprise spring steel, or virtually any material having the necessary resilient characteristics. The thickness of the hinge 30 will also be influenced by the specific material used for the main body portion 18. It has further been found that cutting the main body portion 18 from a single block of material through a well known water jet cutting process appears to yield even better results, and more consistent operating characteristics (i.e., more consistent spring force of the living hinge 30), than molding the main body portion 18 through an injection molding process.

With further reference to FIG. 2, the camming member 28 comprises a manually graspable portion 32 and a camming portion 34. With brief reference to FIG. 3, the second arm 26 includes a slot 36 formed therein which effectively forms a "yoke" in a rear portion 38 of the second arm 26. A pair of bores 40 and 42 (FIG. 3) are formed in alignment with one another through the rear portion 38. The width of the slot 36 is sufficient to accommodate the thickness of the camming member 28.

With further reference to FIGS. 2-5, the camming member 28 further includes an aperture 44 (FIG. 5). A pivot pin 46 (FIG. 2) is inserted through the apertures 40 and 42 (FIG. 3 in order to pivotally couple the camming member 28 to the second arm 26. The camming member 28 may be made from a wide variety of suitably rigid materials such as aluminum, steel or plastic, but in one preferred form is comprised of acetyl, which is a semi-crystalline material having a low coefficient of friction and excellent wear properties.

With further reference to FIG. 2, it will be appreciated that the jaws 20 and 22, in combination with the living hinge 30, cooperatively form an opening 48. As will be appreciated, opening 48 could be formed to more precisely match (or accommodate) a specific assembly that the clamp may be used frequently (or exclusively) with. Additionally, the overall height of the living hinge 30, as well as its thickness, influences the amount of force that the jaws 20 and 22 will exert on the external assembly 16 when the clamp 10 is in its clamped position. Furthermore, the flexibility of the arms 24 and 26 is also an important factor, as well as the thickness of the arms 24 and 26, in influencing the degree of clamping force provided by the clamp 10. As a result, it will be appreciated that the shape and thickness of the assembly with which the clamp 10 will be used with will, in many applications, also be an important consideration that will influence the design of the clamp 10. Also, it will be appreciated that the main body 18 is preferably formed such that the jaws 20 and 22, while in their "rest" positions, are exerting a desired clamping force on the external assembly 16, thus obviating the need for a biasing spring or like element to be included to generate the needed clamping force.

Referring now to FIGS. 6 and 7, the operation of the clamp 10 will be described. In FIG. 6, the clamp is shown in its clamped or closed position with the external assembly 16 clamped between the jaws 20 and 22. Camming surface 35 of the camming portion 34 of the camming member 28 engages an undersurface 25 of the arm 24 to hold the jaws 20 and 22 in the clamped position as shown. In this regard, a well known over center action may be employed by forming the pivot aperture 44 (FIG. 5) on the camming member 28 at a precise position relative to the camming surface 35 such that the reactive forces applied by the arms 24 and 26 will also tend to hold the camming member 28 in the position shown in FIG. 6.

When the external assembly 16 needs to be removed, the camming member 28 is rotated clockwise in the drawing of FIG. 7 into the fully open (i.e., unclamped) position shown in FIG. 7. A small degree of pressure can be applied in accordance with arrows 50 and 52 on the arms 24 and 26, respectively, to spread the jaws 20 and 22 apart from one another. The external assembly 16 can then be removed from between the jaws 20 and 22.

Figure 9:
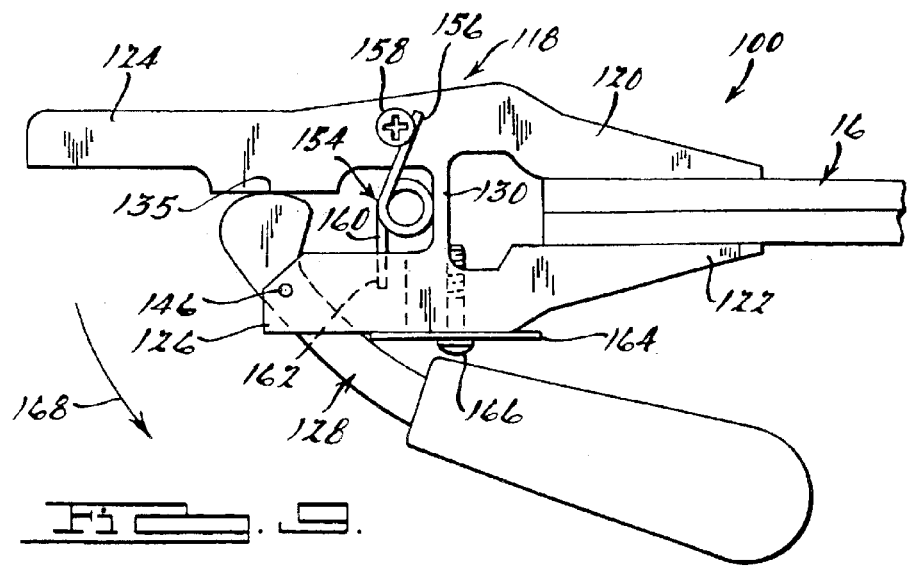
FIG. 9 is a view of the clamp of FIG. 8 but with the clamp in a clamped position.

Referring now to FIGS. 8 and 9, a clamp 100 in accordance with an alternative preferred embodiment of the present invention is shown. The clamp 100 is similar to clamp 10 and, and components common to clamp 10 are designated by reference numerals increased by 100 over those used in describing clamp 10.

The clamp 100 includes a main body portion 118 having jaws 120 and 122 and arms 124 and 126, respectively. Living hinge 130 provides the needed biasing force to hold the jaws 120 and 122 in the clamped position. In addition, a biasing spring 154 has a first end 156 held by a stop element 158. The stop element 158 is illustrated as a threaded screw, but it will be appreciated that a pin, protrusion formed on the main body 118, or any other suitable means may just as readily be used to hold the first end 156 of the spring 154. A second end 160 of the spring 154 extends through a bore 162 in the main body 118 to place the spring under compression. This compression tends to urge the jaws 120 and 122 apart into the position shown in FIG. 8 when the clamp 100 is in its unclamped or "open" orientation, and effectively works against to overcome the biasing tendency of the living hinge 130 to close the jaws 120, 122. A stop washer 164 is held against the arm 126 by a fastening element 166, for example a threaded screw or other suitable fastening element, to provide a positive stop for the camming member 128. The camming member 128 is pivotally held to the lower arm 126 by a pivot pin 146.

In operation, the spring 154 holds the jaws 120 and 122 apart as shown in FIG. 8 to allow the jaws 120,122 of the clamp 100 to be orientated over the external assembly 16. Thus, the user is not required to exert any force to hold the jaws 120, 122 apart while the external assembly 16 is positioned therebetween. Once the external assembly 16 is positioned the between the jaws 120,122, the user merely urges the camming member 128 in accordance with directional arrow 168. This causes the camming surface 135 to be urged into contact with the upper arm 124 to thus lock the jaws 120, 122 in the clamped orientation (FIG. 9). The stop washer164 provides a positive stop for the camming member 128.

A principal advantage of the clamp 100 is that no operator effort is required to hold the clamp in the open position while the clamp is being orientated relative to the external assembly 16. Another advantage is that only a small degree of force is required to move the camming member 128 from the position shown in FIG. 8 to that shown in FIG. 9. Depending on the overall dimensions of the clamp 100, it is possible to move the clamp from the position shown in FIG. 8 to that shown in FIG. 9 with only a single hand while holding the clamp between the thumb and forefinger. The shape of the camming surface 135 can also be made with a sufficient curvature to impart an over center action to assist in urging the camming member 128 into the fully engaged position of FIG. 9.

The present invention thus forms a clamp which can be quickly and easily applied, and reapplied a large plurality of times, during the course of a work project, without causing significant user fatigue. The clamp is relatively inexpensive to construct, durable, and can be moved between its clamped and unclamped states very quickly with only a small degree of user effort.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clamp comprising:

a main body having a first and second pair of jaws separated by a living hinge, and pivotal relative to each other by said living hinge;

said living hinge having a thickness to provide a desired degree of resistance when attempting to spread said jaws apart from one another, to thus enable a clamping action to be effected on a portion of an external assembly inserted between said jaws;

a manually graspable camming member pivotally coupled to a portion of said main body;

said camming member being movable rotationally from a first position, wherein said jaws are prevented from moving out of clamping engagement with said external assembly positioned therebetween, to a second position wherein said jaws are allowed to move to an open orientation to permit insertion therebetween or removal therefrom of said external assembly;

said main body further including:

a first arm extending generally co-extensive with said first jaw;

a second arm extending generally parallel with said first arm and generally co-extensive with said second jaw; and said first and second arms being disposed on an opposite side of said living hinge from said jaws.

2. The clamp of claim 1, further comprising a pivot pin coupled to a portion of said main body and to said camming member for allowing pivotal movement of said camming member relative to said main body.

3. The clamp of claim 1, wherein:

one of said arms includes a slot; and said camming member is secured via a pivot pin to said one of said arms so as to be able to extend through said slot and contact a surface of the other one of said arms.

4. The clamp of claim 3, wherein:

said camming member includes a camming portion spaced apart from a manually graspable portion; and wherein said camming portion contacts said surface of the other one of said arms to urge said arms away from each other, and said jaws toward each other, when said camming member is moved into said first position.

5. The clamp of claim 4, wherein:

said one of said arms forms a yoke, and wherein said graspable portion of said camming member is arranged generally parallel to said one of said arms when said camming member is in said first position; and wherein said graspable portion extends generally co-extensively with said one of said arms when said camming member is moved into said second position.

6. The clamp of claim 1, wherein said main body is comprised of nylon.

7. The clamp of claim 1, wherein the camming member is comprised of acetyl.

* * * * *